US011911993B2

(12) United States Patent
Wright et al.

(10) Patent No.: US 11,911,993 B2
(45) Date of Patent: Feb. 27, 2024

(54) FIXTURE FOR FOLDING A MINIATURE BOX

(71) Applicant: IME Automation, LLC, La Verkin, UT (US)

(72) Inventors: Leo Wright, La Verkin, UT (US); Derek Hall, La Verkin, UT (US); Peter Coles, Morgan, UT (US)

(73) Assignee: IME AUTOMATION, LLC, La Verkin, UT (US)

( * ) Notice: Subject to any disclaimer, the term of this patent is extended or adjusted under 35 U.S.C. 154(b) by 0 days.

(21) Appl. No.: 17/852,150

(22) Filed: Jun. 28, 2022

(65) Prior Publication Data

US 2022/0410521 A1    Dec. 29, 2022

Related U.S. Application Data (60) Provisional application No. 63/215,918, filed on Jun. 28, 2021.

(51) Int. Cl.
| | |
|---|---|
| *B31B 50/26* | (2017.01) |
| *B31B 50/36* | (2017.01) |
| *B31B 100/00* | (2017.01) |
| *B31B 110/35* | (2017.01) |
| *B31B 120/10* | (2017.01) |

(52) U.S. Cl.
CPC ............ *B31B 50/262* (2017.08); *B31B 50/36* (2017.08); *B31B 2100/00* (2017.08); *B31B 2110/35* (2017.08); *B31B 2120/102* (2017.08)

(58) Field of Classification Search
CPC ....... B31B 50/262; B31B 50/36; B31B 50/26; B31B 50/28; B31B 50/32; B31B 50/46; B31B 50/48; B31B 50/50; B31B 50/54; B31B 2100/00; B31B 2110/35; B31B 2120/102

USPC .......................................... 493/131

See application file for complete search history.

(56) References Cited

U.S. PATENT DOCUMENTS

| | | | | |
|---|---|---|---|---|
| 3,110,144 A | * | 11/1963 | Johansen et al. ........ | B65B 11/22 53/232 |
| 3,986,319 A | * | 10/1976 | Puskarz ................ | B65B 11/004 53/228 |
| 4,031,817 A | * | 6/1977 | Raschke ............... | B31B 50/262 493/422 |

(Continued)

OTHER PUBLICATIONS

U.S. Appl. No. 63/215,918, titled "Fixture for Folding a Miniature Box", filed Jun. 28, 2021.

*Primary Examiner* — Sameh Tawfik (74) *Attorney, Agent, or Firm* — Kilpatrick Townsend & Stockton LLP (57) ABSTRACT

A box erecting device for folding a box is disclosed herein. The box erecting device includes a folding plate and a lid erecting system. The folding plate is configured for erecting a box, and a folding notch including a first edge and a second edge is formed in the folding plate. The first edge is configured for erecting a first dust flap of the box, and the second edge is configured for erecting a second dust flap of the box. The lid erecting system is disposed adjacent to the folding plate and is configured for erecting a lid of the box. The lid erecting system includes a tab funnel and a folding tool. The tab funnel includes a ramp for retaining the dust flaps while closing the lid. The folding tool includes a hooked ramp for causing a distal end of the lid to be inserted into the box.

5 Claims, 9 Drawing Sheets

(56) References Cited

U.S. PATENT DOCUMENTS

| | | | | |
|---|---|---|---|---|
| 4,036,117 | A * | 7/1977 | Davies | B65B 19/223 |
| | | | | 53/563 |
| 4,092,816 | A * | 6/1978 | Seragnoli | B65B 19/226 |
| | | | | 53/234 |
| 4,109,444 | A * | 8/1978 | Lee | B65B 7/20 |
| | | | | 53/566 |
| 5,024,641 | A * | 6/1991 | Boisseau | B31B 50/44 |
| | | | | 493/143 |
| 5,106,359 | A * | 4/1992 | Lott | B31B 50/262 |
| | | | | 493/182 |
| 7,200,978 | B1 * | 4/2007 | Focke | B65B 19/20 |
| | | | | 53/225 |
| 8,696,535 | B2 * | 4/2014 | Vizanova Alzamora | |
| | | | | B31B 50/00 |
| | | | | 493/51 |
| 10,227,148 | B2 * | 3/2019 | Bruker | B65B 11/16 |
| 2006/0205579 | A1 * | 9/2006 | Boix Jaen | B31B 50/46 |
| | | | | 493/143 |
| 2008/0120948 | A1 * | 5/2008 | Martin | B65B 49/14 |
| | | | | 53/491 |
| 2015/0183539 | A1 * | 7/2015 | Cox | B65B 51/10 |
| | | | | 53/558 |
| 2017/0348939 | A1 * | 12/2017 | Langen | B31B 50/28 |
| 2021/0237914 | A1 * | 8/2021 | Jonker | B65B 7/28 |
| 2022/0048651 | A1 * | 2/2022 | de Jong | B65B 7/20 |
| 2022/0184912 | A1 * | 6/2022 | Olmos | B31B 50/07 |

* cited by examiner

FIXTURE FOR FOLDING A MINIATURE BOX

CROSS-REFERENCES TO RELATED APPLICATIONS

This application claims the benefit of U.S. Provisional Application No. 63/215,918, filed Jun. 28, 2021, titled "FIXTURE FOR FOLDING A MINIATURE BOX," the entire contents of which are hereby incorporated in their entirety for all purposes.

TECHNICAL FIELD

The present disclosure relates generally to tools for robotic operations, and more particularly (although not necessarily exclusively), to a box erecting device for folding a box.

BACKGROUND

Various items, such as consumer products, are packaged in boxes that can range from very small to very large. In some cases, small items are produced or otherwise distributed with large volume. Accordingly, the packaging used to present or transport the small items may also be produced or distributed with large volume. The packaging is commonly mass-produced in an unfolded configuration that cannot be used to present or transport the small items. Thus, each individual package may need to be folded or otherwise prepared for the small item prior to use. Folding each individual package can be difficult, time-consuming, and otherwise technically challenging.

SUMMARY

According to certain embodiments of the present disclosure, a box erecting device is provided for folding a box. The box erecting device includes a folding plate and a lid erecting system. The folding plate is configured for erecting a box. A folding notch includes a first edge and a second edge that are formed in the folding plate. The first edge is configured for erecting a first dust flap of a pair of dust flaps of the box, and the second edge is configured for erecting a second dust flap of the pair of dust flaps of the box. The lid erecting system is disposed adjacent the folding plate and configured for erecting a lid of the box. The lid erecting system includes a tab funnel and a folding tool. The tab funnel includes a ramp configured for retaining, via the lid, the pair of dust flaps at least partially within the box while closing the lid. The folding tool includes a hooked ramp configured for causing insertion of a distal end of a tuck flap to the lid into the box.

In some embodiments, the lid erecting system is fixedly mounted to the folding plate. In certain embodiments, the folding plate includes a first side and a second side opposite the first side, and the lid erecting system is fixedly mounted to the first side of the folding plate. In some embodiments, the folding plate includes a first portion extending in a first direction and a second portion extending in a second direction that is about normal to the first direction. The folding notch is formed in the first portion, the tab funnel is fixedly mounted to a first side of the second portion, and the folding tool is fixedly mounted to a second side of the second portion. In certain embodiments, the folding plate includes a rigid wall characterized by a top and a bottom that is mountable to a mounting surface at the bottom, and an opening is formed through the folding plate that intersects the folding notch. The opening is disposed between the folding notch and the bottom of the rigid wall.

In some embodiments, the tab funnel includes a wedge for folding the tuck flap towards a main compartment of the box while closing the lid. In certain embodiments, the ramp is a first ramp aligned with a first plane, and the tab funnel includes a second ramp aligned with a second plane that is offset from the first plane. In some embodiments, the hooked ramp includes a hook portion connected to a ramp portion. The ramp portion is configured for sliding engagement with the tuck flap while the box is pushed towards the ramp portion and in the direction of the hook portion, and the hook portion is configured to bend the distal end of the tuck flap into a compartment of the box when the box is pushed towards the hook portion. In certain embodiments, a first surface of the ramp portion is substantially coplanar with a second surface of the ramp of the tab funnel. In some embodiments, the folding plate includes one or more mounting feet configured for mounting the box folding device to a support frame.

According to certain embodiments of the present disclosure, a box erecting fixture is provided for folding a box. The box erecting fixture includes a mounting plate, a box erecting device, and a box retaining structure. The box erecting device is fixedly mounted to the mounting plate and configured for erecting a box. The box erecting device includes a folding plate and a lid erecting system. The folding plate includes a notch configured for erecting a pair of dust flaps of the box. The lid erecting system is fixedly mounted to the folding plate and configured for erecting a lid of the box. The box retaining structure is fixedly mounted to the mounting plate adjacent the box erecting device and configured for retaining one or more unassembled boxes.

In some embodiments, the mounting plate includes one or more alignment pins configured for aligning the box erecting fixture with respect to a robotic manipulator. In certain embodiments, the box erecting fixture includes a set of handles fixedly coupled to the mounting plate and configured for lifting the box erecting fixture. In some embodiments, the box retaining structure includes a set of walls that define a U-shaped portion with a pair of opposing sloped portions. The pair of opposing sloped portions is configured for funneling the one or more unassembled boxes towards the U-shaped portion. In certain embodiments, the box retaining structure includes one or more connecting structures for connecting with an unassembled box chute of a box feeder system when the box retaining structure is included in a box erecting system that includes the box feeder system.

According to certain embodiments of the present disclosure, a box erecting system is provided for folding a box. The box erecting system includes a support frame, a box erecting device, and a robotic manipulator. The box erecting device is fixedly mounted to the support frame and configured for erecting a box. The box erecting device includes a folding plate and a lid erecting system. The folding plate includes a notch configured for erecting a pair of dust flaps of the box. The lid erecting system is fixedly mounted to the folding plate and configured for erecting a lid of the box. The robotic manipulator is fixedly mounted to the support frame and includes an end effector. The robotic manipulator is configured for manipulating the box with respect to the box erecting device using the end effector to erect the box.

In some embodiments, the box erecting system includes a mounting plate that is detachably mounted to the support frame adjacent the robotic manipulator, and the box erecting device is fixedly mounted to the mounting plate. In certain embodiments, the box erecting system includes an assembled box chute that includes a ramp and is disposed adjacent the robotic manipulator. The robotic manipulator is configured to drop the box into the assembled box chute after the box has been assembled. In some embodiments, the box erecting system includes a box retaining structure and a box feeder system. The box retaining structure is fixedly mounted to the support frame adjacent the box erecting device and is configured for retaining one or more unassembled boxes. The box feeder system includes an unassembled box chute that is connected to the box retaining structure. The robotic manipulator is configured to pick up the box in an unassembled state from the box retaining structure before using the box erecting device to erect the box.

In some embodiments, the robotic manipulator is configured to manipulate the box with respect to the folding plate to erect a main compartment of the box by pushing the box against a surface of the folding plate and to erect the pair of dust flaps by pushing the pair of dust flaps against edges of a folding notch of the folding plate. Additionally, the robotic manipulator is configured to manipulate the box with respect to a tab funnel of the lid erecting system to retain the pair of dust flaps at least partially within the main compartment. And, the robotic manipulator is configured to manipulate the box with respect to a folding tool of the lid erecting system to cause insertion of a distal end of a tuck flap of the box into the main compartment of the box after the tab funnel has been used to retain the pair of dust flaps at least partially within the main compartment.

BRIEF DESCRIPTION OF DRAWINGS

The present disclosure is described in conjunction with the appended figures.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Certain aspects and features of the present disclosure relate to a box erecting device for folding a box using a box erecting system. The box erecting system can include a robot (e.g., a robotic manipulator), the box erecting device, a computing device, and any other suitable components or features for folding the box such as those described herein. The box can include any suitable package for presenting, transporting, storing, or otherwise containing an item such as a consumer product or other suitable items. The robot can manipulate the box against the box erecting device or any component thereof to fold the box.

Examples are described herein in the context of a box erecting device for folding boxes such as miniature boxes. Those of ordinary skill in the art will realize that the following description is illustrative only and is not intended in any way to be limiting. For example, the features described with respect to box erecting device are applicable to folding other containers that include rigid or semi-rigid parts and are also applicable to the assembly of boxes having different form factors than those expressly described herein. Reference will now be made in detail to implementations of examples as illustrated in the accompanying drawings. The same reference indicators will be used throughout the drawings and the following description to refer to the same or like items. While measurements of some of the structures are given, it should be understood that these are examples and structures having other dimensions representing different portions are covered by this description.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Manual assembly of boxes, especially those that are relatively small, such as those with volumes of between 200 and 250 cubic centimeters, may be time-consuming and may delay upstream processes and downstream processes. This may partially be due to the design of the boxes, as described further with respect to FIG. 2. For example, closing one end of an exemplary box may require closing, and possibly retaining closed, two or more dust-covering components (e.g., flaps) and then inserting a distal end of a tuck flap into a narrow opening defined between uppermost edges of the dust flaps and the main box body.

The box erecting device described herein may enable an automated operator, such as a robotic manipulator, to assemble such boxes more efficiently, with less error, and at a rate that far outpaces what a human or multiple humans could achieve. Generally, the box erecting device is a structure that can be rigidly attached to a surface, such as a platform, table top, or the like, and that includes a combination of notches and projections that can be pushed-against by a robotic manipulator to automatically assemble a box.

In a particular example, a box erecting system may include a robotic manipulator, a support frame, a box erecting fixture, and a box erecting device. The robotic manipulator, the box erecting fixture, and/or the box erecting device can be fixedly mounted on the support frame, any suitable component thereof, such as a support surface of the support frame, or the like. For example, the box erecting device can be positioned (e.g., using the box erecting fixture) on the support frame such that the robotic manipulator can fold or otherwise assemble the box using the box erecting device. The box erecting fixture can include a mounting frame that can receive the box erecting device, a box retaining device, and/or other suitable components. For example, the box erecting fixture can receive the box erecting device and the box retaining device such that the box erecting device is adjacent to or otherwise proximate to the box retaining device.

When the box erecting fixture is positioned on or otherwise suitably with respect to the box erecting system, the box retaining device and the box erecting device can be positioned proximate to the robotic manipulator. For example, when the box erecting fixture is positioned suitably with respect to the box erecting system, the robotic manipulator can pick up or otherwise manipulate boxes originating in the box retaining device and can assemble the boxes using the box erecting device. In some examples, the robotic manipulator, or other suitable entity, can use a folding plate and a lid erecting system of the box erecting device to assemble the box. For example, the robotic manipulator can fold dust flaps of the box using the folding plate and, while retaining the dust flaps at least partially in the box, the robotic manipulator can fold the lid of the box using the lid erecting system.

Figure 1:
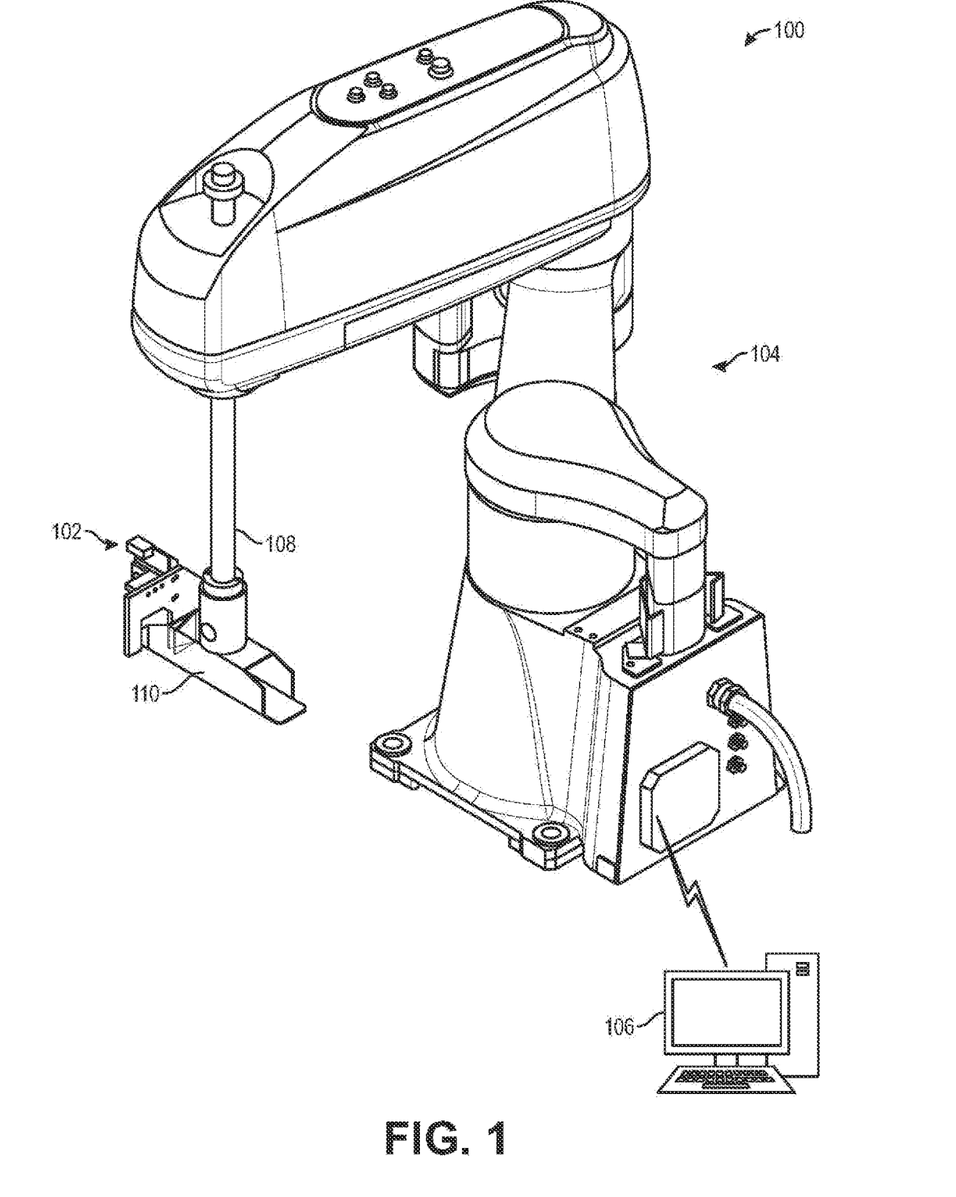
FIG. 1 is an example of a box erecting system according to some examples of the present disclosure.

Turning now to the Figures, FIG. 1 illustrates an example of a box erecting system 100 that includes a box erecting device 102, a robotic manipulator 104, and a computer system 106. The robotic manipulator 104 can include an end effector 108 that can manipulate a box 110 intended to be folded. For example, the box erecting system 100 is illustrated with the end effector 108 of the robotic manipulator 104 retaining the box 110 in a partially assembled state.

The robotic manipulator 104 may manipulate the box 110 against the box erecting device 102 for causing the box 110 to be folded. For example, the robotic manipulator 104 may cause various flaps of the box 110 to contact various portions of the box erecting device 102 to cause the various flaps to fold, which allows the box 110 to be transformed into a folded configuration. In some examples, the computer system 106 may be a robotic controller or other suitable control electronics for controlling the robotic manipulator.

The robotic manipulator 104 may be any suitable manipulator including an end effector and having any suitable number (e.g., three, four, five, six, etc.) of degrees of freedom. As illustrated, the robotic manipulator 104 is an example of a Selective Compliance Assembly Robot Arm (SCARA), but other manipulators, such as articulated robots, Cartesian coordinate robots, cylindrical coordinate robots, spherical coordinate robots, and any other suitable robot (including collaborative robots), may be used. The computer system 106 may be configured to control the operation of the robotic manipulator 104 and other aspects of an automated facility in which the box erecting system 100 is implemented. In some examples, the box erecting system 100 may be particularly configured for erecting boxes using a four-dimensional robot such as a SCARA.

Figure 2:
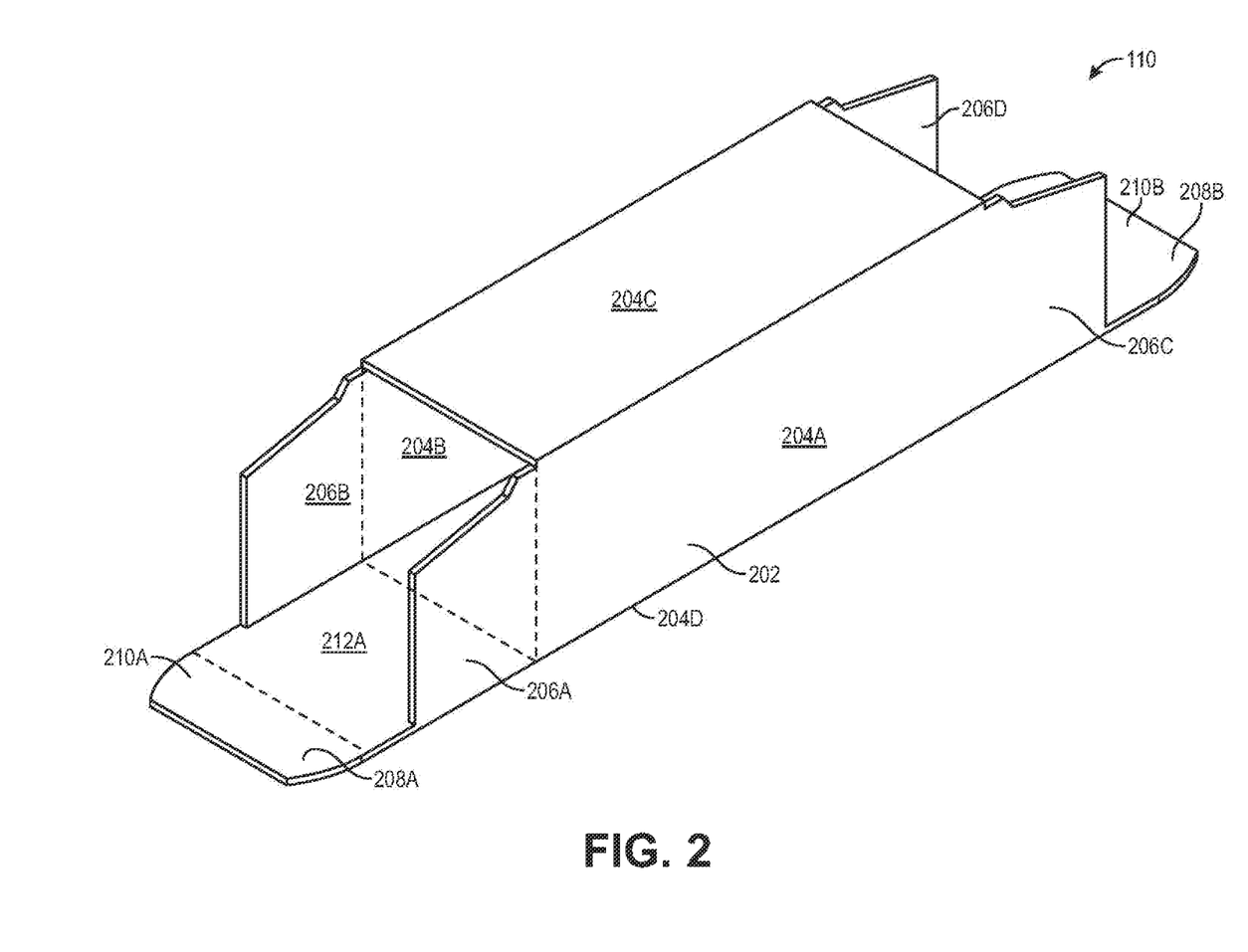
FIG. 2 is an example of a box that can be folded by the box erecting system of FIG. 1 according to some examples of the present disclosure.

FIG. 2 illustrates an example of a box 110 that can be used with the box erecting system 100 according to at least one example. For example, the box 110 can be folded or otherwise erected by the box erecting system 100. As illustrated in FIG. 2, the box 110 is in a partially assembled state. In particular, a main compartment 202 is illustrated as being assembled. The main compartment 202 may include four sides 204a-204d that, in combination, define a rectangular volume, though other suitably shaped volumes (e.g., cylindrical, cubic, irregular shapes, etc.) are possible. In the illustrated example, the dimensions of each side 204 may be about 3-6 cm (e.g., 4.5 cm) and 8-14 cm (e.g., 11.5 cm), though other suitably sized dimensions are possible for the box 110.

As illustrated in FIG. 2, the box 110 also includes dust flaps 206a-206d. The dust flaps 206a-206d may be configured to fold inward, such as towards each other, along the dashed lines dividing the dust flaps from the sides 204a and 204b, or in other suitable directions. The dust flaps 206 may include a generally rectangular shape except for a small section on top edges (as illustrated) that are cut away. When the dust flaps 206 are closed, the cut-away sections define an opening into which distal ends of lids 210a and 210b can be positioned for closing the box 110.

Each lid 210 can include a tuck flap 208, a closure panel 212, and any other suitable components. Each closure panel 212 is connected to a side (e.g., the side 204d) and the corresponding tuck flap 208. Each closure panel 212 is configured for bending at the location where it connects to the side 204d. Each tuck flap 208 is configured for bending at the location where it connects to the closure panel 212.

The box 110 can be folded or otherwise erected by the box erecting system 100. For example, the robotic manipulator 104 can manipulate the box 110 such that the dust flaps 206a-d (e.g., individually or in any suitable combination) are folded and then the lids 210a-b (e.g., individually or in combination) are inserted into the main compartment 202 on top of corresponding folded dust flaps 206a-d. In some embodiments, the robotic manipulator 104 pushes the dust flaps 206a-d, the lid 210, any suitable component thereof, or any other suitable components of the box against suitable portions of the box erecting device 102 to cause the box 110 to be folded.

Figure 3:
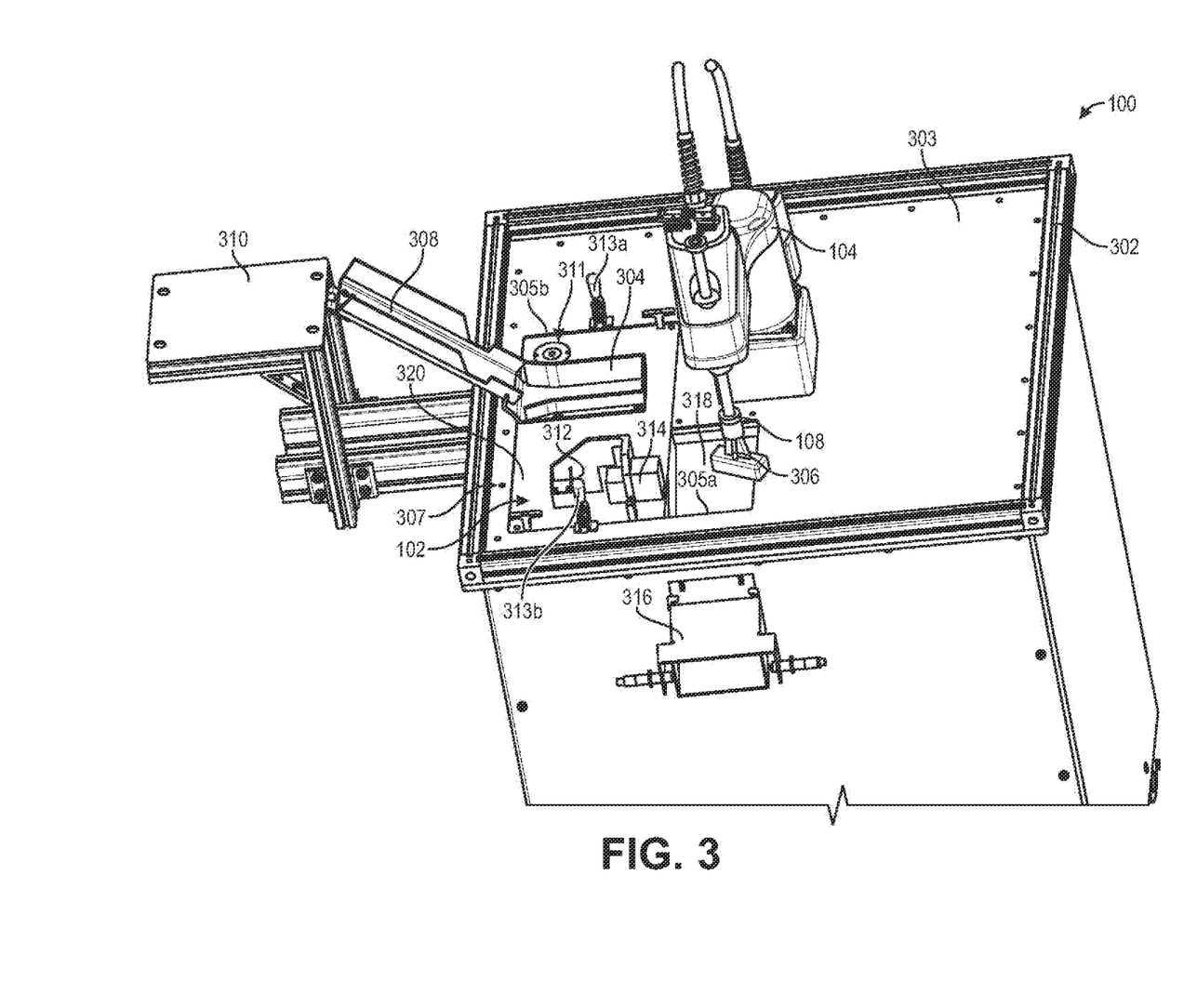
FIG. 3 is a perspective view of the box erecting system of FIG. 1 that includes a box erecting device according to some examples of the present disclosure.

FIG. 3 illustrates a perspective view of the box erecting system 100 of FIG. 1 that includes a box erecting device 102. As illustrated, the box erecting system 100 is positioned on a support frame 302, but the box erecting system 100 can be positioned on any other suitable, rigid surface that allows the box 110 to be folded by the box erecting system 100. The support frame 302 can be square-shaped, rectangular-shaped, circular-shaped, or any other suitable shape for retaining the box erecting system 100. In some embodiments, the support frame 302 includes an exterior shell (not shown) that encapsulates elements of the box erecting system 100 for increased safety. In some embodiments, a support surface 303 is secured to or otherwise supported by the support frame 302. The support surface 303 may generally be planar and may be formed from a sheet material of rigid composition. As illustrated, the support surface 303 includes various openings for receiving components of the box erecting system 100. For example, the support surface 303 can include a first opening 305a for receiving a box chute 316, a second opening 305b for receiving a box erecting fixture 307, and/or any other suitable openings. In some embodiments, the box erecting fixture 307 can be positioned in a recess in the support surface 303 such that the recess is sized to match the box erecting fixture 307.

As illustrated, the box erecting system 100 includes the robotic manipulator 104 and the box erecting fixture 307 upon which is mounted the box erecting device 102 and a box retaining device 304. The robotic manipulator 104 can be fixedly mounted to the support frame 302 and includes the end effector 108, which is illustrated as including a vacuum nozzle 306. The vacuum nozzle 306 may include one, two, three, or more channels through which vacuum can be formed for picking up the box 110. In some examples, the end effector 108 may include a suction block that includes a rectangular block including a lower planar surface and one, two, three, or more suction cups or other suction nozzles disposed along the lower planar surface. In some examples, the lower surface of the suction block may include a material with a high coefficient of friction (e.g., non-abrasive, slip-proof grip tape such as CatTongue® Grips). For example, the robotic manipulator 104 can position the end effector 108 such that the vacuum nozzle 306 is positioned abutting a surface of the box 110, and the robotic manipulator 104, or the computer system 106, can cause a vacuum to form in the vacuum nozzle 306 that causes the box 110 to temporarily adhere to the vacuum nozzle 306. While adhered to the vacuum nozzle 306, the box 110 can be folded by the box erecting system 100, for example by the robotic manipulator 104 pushing various portions of the box 110 against various portions of the box erecting device 102 in a certain order.

In some embodiments, the box erecting fixture 307 is easily removable and replaceable with respect to the box erecting system 100. The box erecting system 100 may include one or more clamps 313 or other suitable retaining devices configured for retaining the box erecting fixture 307 to the support surface 303. In some examples, the clamps 313 may be installed to the box erecting fixture 307 and clamp to the support surface 303. For example, the clamps 313 may be toggle claims configured for vertical hold down and quick release such as those manufactured by DE-STA-CO. Each separate box erecting fixture 307 can be sized to accommodate differently sized boxes. Accordingly, each separate box erecting fixture 307 can include a different box erecting device 102, a different box retaining device 304, and/or other suitable different components. In some examples, the box erecting fixture 307 includes a visual indicator 311 that visually indicates a type of box that the box erecting fixture 307 is configured to accommodate. For example, and as illustrated, the box erecting fixture 307 includes the visual indicator 311 that is an "A," which may indicate that box type "A" can be accommodated by the box erecting fixture 307. In other examples, the visual indicator 311 can be replaced or augmented by a radio-frequency identification (RFID) chip indicator or other suitable indicators. The visual indicator 311 may be referenced by an operator to load the appropriate set of instructions for the robotic manipulator 104 to erect boxes of the type identified by the visual indicator. In some examples, the loading of instructions may be performed more or less in an automated manner. For example, a computer vision system may view the visual indicator 311 and send a signal to the controller to load the appropriate instructions. As an additional example, an RFID chip may be included in the box erecting fixture 307, and a corresponding RFID reader may be implemented in the box erecting system 100 to ready the RFID chip, obtain unique information from the chip (e.g., identifying the box erecting fixture 307 as a type A), and send a signal corresponding to the unique information to the controller to load the appropriate instructions. In some examples, a near-field communication (NFC) chip may be used in place of or in addition to the other indicators described herein.

Figure 6:
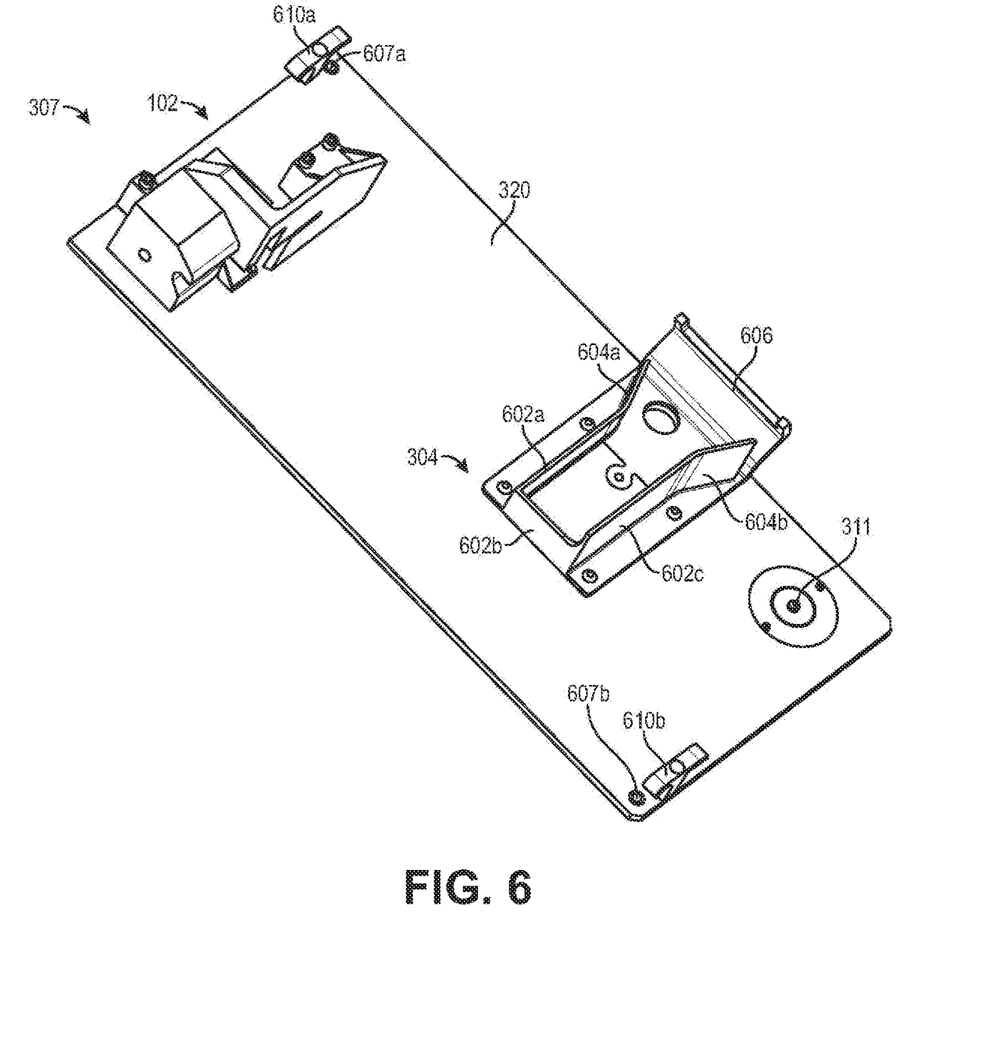
FIG. 6 is a perspective view of a box erecting fixture according to some examples of the present disclosure.

As illustrated in FIG. 6 in more detail, the box erecting fixture 307 includes a mounting plate 320, the box erecting device 102, and the box retaining device 304. The box erecting device 102 includes a folding plate 312 and a lid erecting system 314, and/or any other suitable components for allowing the box 110 to be folded. The box erecting device 102 can be fixedly mounted to the mounting plate 320. The box retaining device 304 can be fixedly mounted to the mounting plate 320 and can be positioned adjacent or otherwise proximate to the box erecting device 102. The box retaining device 304 can retain one or more unassembled boxes such as the box 110 in an unfolded configuration. The mounting plate 320 may take any suitable shape, the perimeter of which may correspond in size and shape to a recess in the support surface 303. Edges of the recess may function as an alignment structure to align the mounting plate 320 with respect to the support surface 303. Additionally, engagement between the edges of the perimeter and corresponding edges of the recess may function to restrict lateral and transverse movement of the mounting plate 320.

In some embodiments, the box retaining device 304 includes a set of walls 602a-c that define a U-shaped portion. For example, the wall 602a and the wall 602c are illustrated as being substantially parallel, a first side of the wall 602a is connected to a first side of the wall 602b, and a second side of the wall 602b is connected to a first side of the wall 602c. Additionally, the box retaining device 304 can include a pair of opposing sloped walls 604a-b that can funnel one or more unassembled boxes toward the U-shaped portion defined by the walls 602a-c. For example, and as illustrated, the wall 604a is connected to a second side of the wall 602a and is nonparallel to the wall 602a, and the wall 604b is connected to a second side of the wall 602c and is nonparallel to the wall 602c. The walls 604a-b can be flared outward to define a larger opening than that provided by a combination of the wall 602a and the wall 602c. In some embodiments, the box retaining device 304 includes a connecting structure 606 that is configured to connect with the box chute 308 to allow the box retaining device 304 to receive the box 110 in an unfolded configuration from the box feeder system 310. More than one connecting structure 606 can be included with the box retaining device 304.

In some embodiments, the mounting plate 320 includes one or more alignment pins 607 for aligning the box erecting device 102 with respect to the robotic manipulator 104. The one or more alignment pins 607 may be positioned on opposite corners of the mounting plate 320 adjacent handles 610. The alignment pins 607 may include an elongated structure configured for insertion into a corresponding hole or groove formed in the recessed portion of the support surface 303. For example, installing the box erecting fixture 307 on a box erecting system 100 using the alignment pins 607 may cause the box erecting device 102 to be positioned such that the robotic manipulator 104 can use the box erecting device 102 to fold the box 110. Additionally, the box erecting fixture 307 can include handles 610a-b that are fixedly coupled to the mounting plate 320. The handles 610a-b can be used to lift the box erecting fixture 307 (e.g., from the box erecting system 100). The handle 610a can be positioned opposite the handle 610b with respect to the box erecting fixture 307 to provide a balanced way for picking up and moving the box erecting fixture 307.

Returning to FIG. 3, the box retaining device 304 can receive the box 110, or other suitable packaging material to be folded, in an unfolded configuration. For example, and as illustrated, the box retaining device 304 is coupled to a box chute 308 that is coupled to a box feeder system 310. The box feeder system 310, which may include any suitable mechanism or other device, can cause the box 110 in an unassembled or unfolded configuration to be directed into the box chute 308 that can direct the box 110 into the box retaining device 304. The box 110 in the unfolded configuration can be retained in the box retaining device 304 until the robotic manipulator 104 is caused to position the end effector 108 over the box 110 to pick up the box 110 to fold the box 110 using the box erecting device 102.

The box erecting device 102 can include various structures and/or components for allowing the robotic manipulator 104 to fold the box 110. For example, and as illustrated here and in more detail in later figures, the box erecting device 102 includes a folding plate 312 and a lid erecting system 314. The box erecting device 102 can include any other suitable structures or components for allowing the robotic manipulator 104 or other suitable component of the box erecting system 100 to fold the box 110. In some embodiments, more than one box erecting device 102 can be included in the box erecting system 100. For example, a folding tool of a first box erecting device can be positioned adjacent to a folding tool of a second box erecting device such that the first box erecting device and the second box erecting device are mirrored copies.

As illustrated, the box erecting system 100 additionally includes a box chute 316. The box chute 316 can be positioned within the support frame 302, below the support frame 302, or otherwise suitably with respect to the support frame 302 for providing the box 110 in the folded configuration. The box chute 316 can be coupled to or otherwise include a ramp 318 that extends from a location that the robotic manipulator 104 drops the box 110 in the folded configuration to the box chute 316. In some embodiments, the box chute 316 is disposed adjacent to the robotic manipulator 104 or proximate enough to the robotic manipulator 104 to receive the box 110 in the folded or assembled configuration subsequent to the robotic manipulator 104 folding the box 110 using the box erecting device 102. For example, the robotic manipulator 104 can assemble the box 110 using the box erecting device 102 and then drop the box 110 in the assembled configuration such that the box 110 is provided via the box chute 316.

The box erecting device 102, the box retaining device 304, and/or any other suitable component of the box erecting system 100 can be disposed on a mounting plate 320. In some embodiments, the mounting plate 320 is detachably mounted to the support frame 302 and is adjacent to the robotic manipulator 104. The box erecting device 102, the box retaining device 304, and/or any other suitable component of the box erecting system 100 can be fixedly mounted to the mounting plate 320. In some embodiments, as described in more detail with respect to FIG. 6, the mounting plate 320 includes a quick-change set of tools (e.g., the box erecting device 102, the box retaining device 304, etc.) configured for allowing the robotic manipulator 104 to fold different types of boxes 110.

Figure 4:
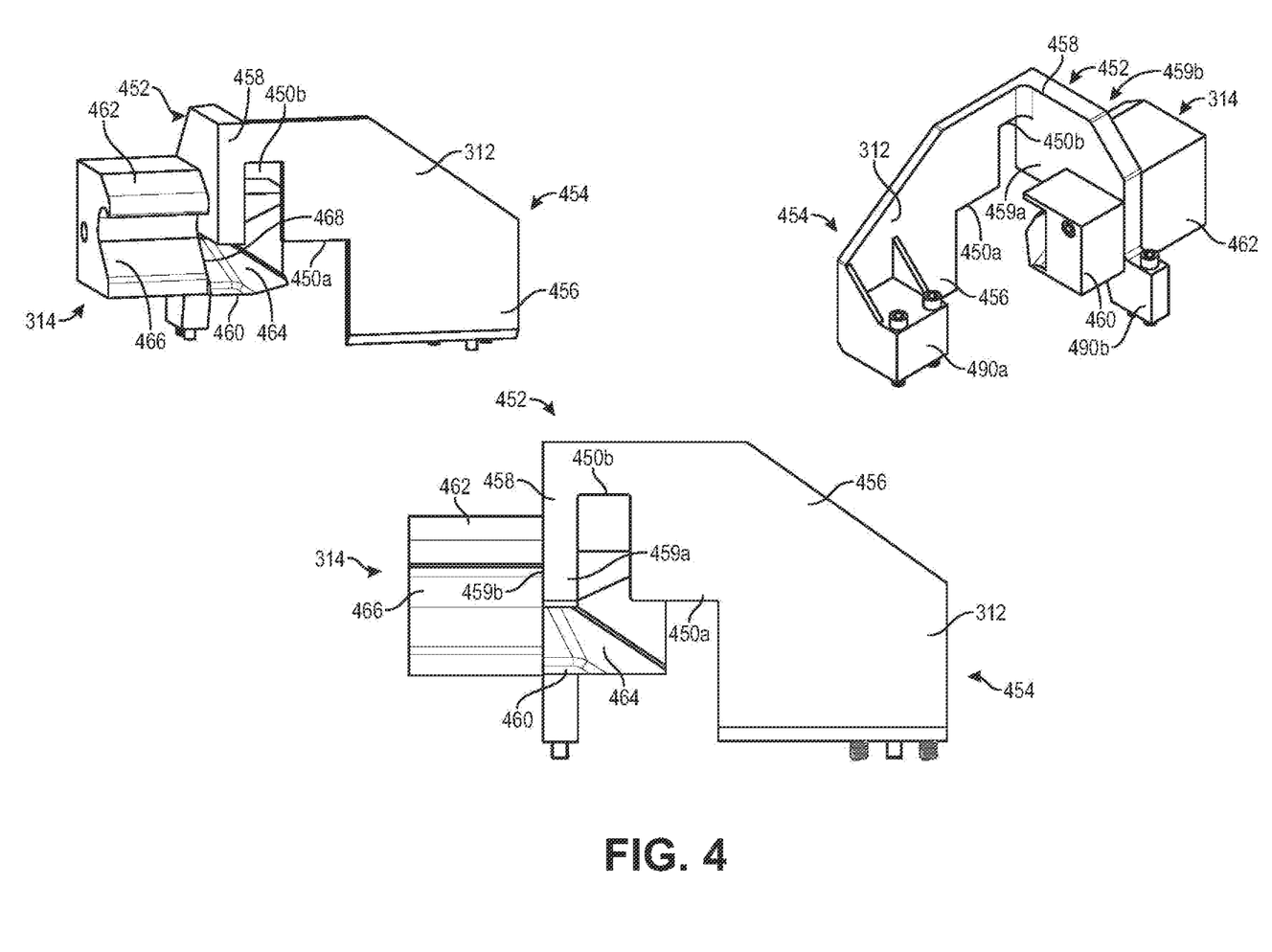
FIG. 4 is a set of views of the box erecting device of FIG. 3 according to some examples of the present disclosure.
Figure 5:
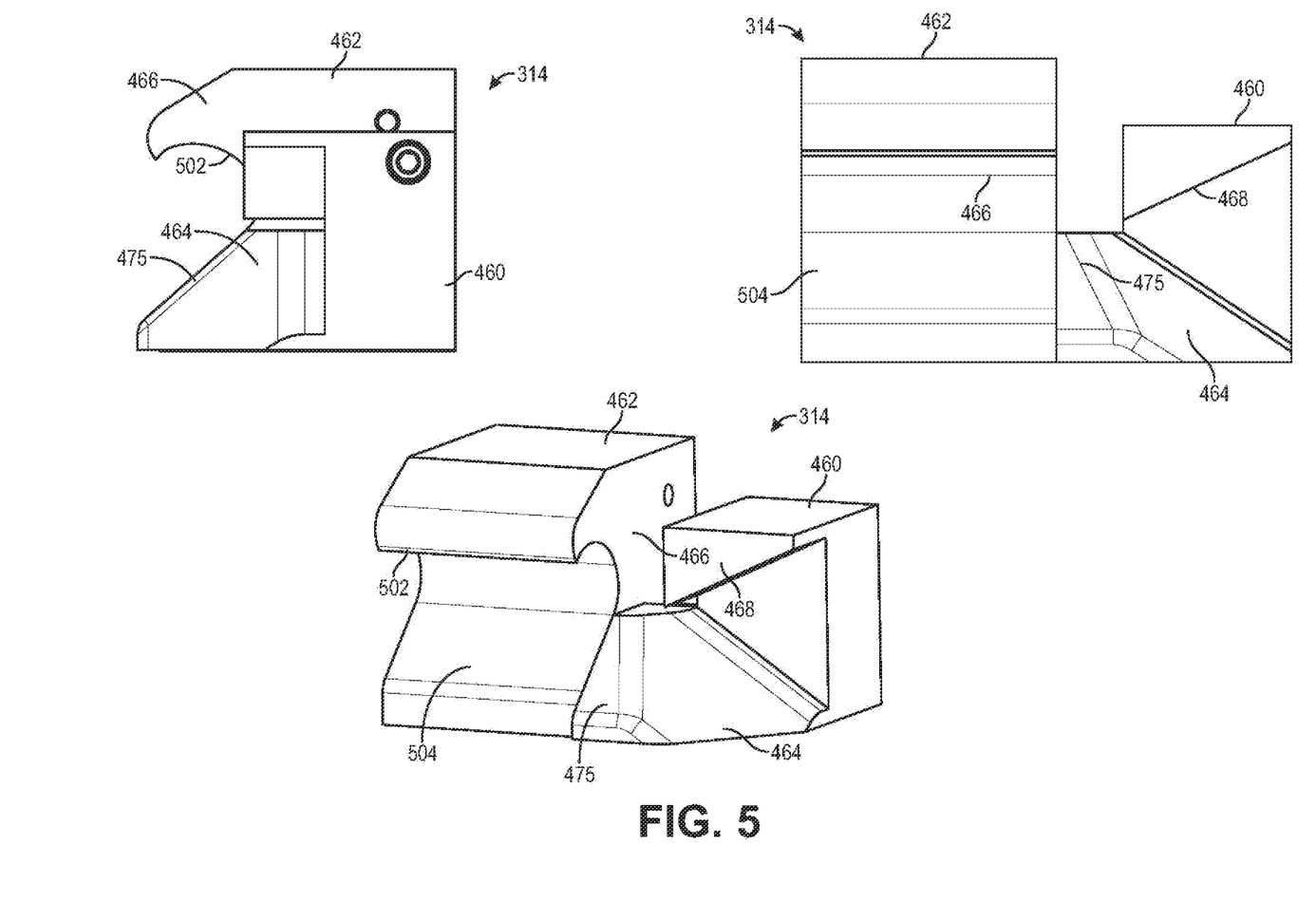
FIG. 5 is a set of views of a lid erecting system of the box erecting device of FIG. 3 according to some examples of the present disclosure.

FIG. 4 illustrates various views of an example of a box erecting device 102, and FIG. 5 illustrates various views of the lid erecting system 314 of the box erecting device 102, according to various examples. As illustrated, the box erecting device 102 includes the folding plate 312 and the lid erecting system 314. In some examples, the folding plate 312 is fixedly mounted to the lid erecting system 314 and/or vice versa. The box erecting device 102 can include any other suitable components for erecting the box 110.

The folding plate 312 can be positioned adjacent to or otherwise abutting the lid erecting system 314 to allow the box 110 to be folded. In some embodiments, the folding plate 312 can include one or more notches 450 for erecting one or more components of the box 110. For example, one or more components (e.g., one or more of the dust flaps 206a-d) of the box 110 can be pressed against the folding plate 312 to fold the one or more components, and then the box 110, with at least partially folded components, can be directed to the lid erecting system 314 to cause the lid 210 of the box 110 to be folded. In some embodiments, the lid erecting system 314 is fixedly mounted to the folding plate 312. In some embodiments, the robotic manipulator 104 can use the box erecting device 102 to fold the box 110 as described above into a folded configuration.

The folding plate 312 includes one or more notches 450. For example, and as illustrated, the folding plate 312 includes a first notch 450a and a second notch 450b, though other suitable numbers (e.g., one, three, four, or more) of notches 450 are possible for the folding plate 312. In some embodiments, the folding plate 312 includes one notch 450 that includes one or more sides (e.g., similar to the first notch 450a and the second notch 450b). Each side of the one or more sides (or each notch of the first notch 450a and the second notch 450b) may be configured for erecting a corresponding dust flap 206 of the box 110. For example, the first notch 450a (or first side of the notch 450) may be arranged or otherwise configured to fold a first dust flap 206a, and the second notch 450b (or second side of the notch 450) may be arranged or otherwise configured to fold a second dust flap 206b.

Additionally, the folding plate 312 can include a first side 452 and a second side 454 that is positioned opposite the first side 452. In some embodiments, the lid erecting system 314 is fixedly mounted to the first side 452 of the folding plate 312, though in other embodiments, the lid erecting system 314 can be fixedly mounted to the second side 454 of the folding plate 312.

The folding plate 312 can additionally include a first portion 456 extending in a first direction and a second portion 458 extending in a second direction. In some embodiments, the first direction is approximately normal or orthogonal to the second direction. The notch 450 (e.g., including the first notch 450a and the second notch 450b, etc.) can be formed in the first portion 456, a tab funnel 460 of the lid erecting system 314 can be fixedly mounted to a first side 459a of the second portion 458, and a folding tool 462 of the lid erecting system 314 can be fixedly mounted to a second side 459b of the second portion 458.

The lid erecting system 314 is disposed adjacent to the folding plate 312. For example, and as illustrated, the lid erecting system 314 is positioned abutting (e.g., fixedly mounted to) the folding plate 312. In some embodiments, the lid erecting system 314 includes the tab funnel 460 and the folding tool 462, which may formed as a single part or as separate parts. As illustrated, the tab funnel 460 is positioned adjacent to the folding plate 312 and to the folding tool 462, and the folding tool 462 is positioned adjacent the tab funnel 460 and distal with respect to the first portion 456 of the folding plate 312. Additionally, the tab funnel 460 can be positioned abutting the first side 459a of the second portion 458 of the folding plate 312, and the folding tool 462 can be positioned abutting the second side 459b of the second portion 458 of the folding plate 312.

The tab funnel 460 can include one or more ramps 464 and/or 475 that can retain the folded dust flaps 206 at least partially within the box 110 while the robotic manipulator 104 closes the lid 210 of the box 110. For example, the robotic manipulator 104 can use the folding plate 312 to fold the dust flaps 206 into the box 110, and then the robotic manipulator 104 can move the box across the one or more ramps 464 and/or 475 of the tab funnel 460 to apply pressure to the lid 210 of the box 110 to prevent the folded dust flaps 206 from unfolding prior to folding the lid 210. Accordingly, the one or more ramps 464 and/or 475 can be configured for retaining, via the lid 210, the dust flaps 206 at least partially within the box 110 while closing the lid 210. Additionally, the tab funnel 460 can include a wedge 468 for folding the tuck flap 208 towards the main compartment 202 of the box 110 while closing the lid 210. In some embodiments, the second ramp 475 can be offset from the ramp 464. For example, the ramp 464 can be aligned with a first plane, and the second ramp 475 can be aligned with a second plane such that the first plane is different than (or otherwise offset from) the second plane. The second plane can be aligned with a plane associated with a ramp portion 504 (e.g., see FIG. 5) of the folding tool 462. In some embodiments, the second ramp 475 allows the lid 210 of the box 110 to be transferred from the tab funnel 460 to the folding tool 462 while retaining at least some pressure on the lid 210 to prevent the dust flaps 206 from being unfolded during the transfer.

The folding tool 462 can include a hooked ramp 466 that can cause a distal end 210*a* or 210*b* of a tuck flap 208 of the lid 210 to be inserted into the box 110. As illustrated, the hooked ramp 466 is positioned at a top portion of the folding tool 462, but the hooked ramp 466 can be positioned in any other suitable location with respect to the folding tool 462 for allowing the robotic manipulator 104 to insert the lid 210 into the box 110 using the folding tool 462. In some embodiments, the hooked ramp 466 can be otherwise suitably shaped (e.g., instead of curved) such as including a rectangular cross-section, triangular cross-section, and the like. The robotic manipulator 104 can press the box 110 against the hooked ramp 466 to cause the lid 210 to be inserted into the box 110.

In some embodiments, as illustrated in greater detail in FIG. 5, the hooked ramp 466 includes a hook portion 502 and a ramp portion 504. The hook portion 502 can be connected to the ramp portion 504. The ramp portion 504 can be configured for sliding engagement with the tuck flap 208 while the box 110 is pushed towards the ramp portion 504 and in a direction of the hook portion 502. The robotic manipulator 104 can push the distal end of the tuck flap 208 against the hook portion 502 for causing the tuck flap 208 to be positioned in the box 110 or any component thereof. In some embodiments, a first surface of the ramp portion 504 can be substantially coplanar with a second surface of the second ramp 475 of the tab funnel 460.

In some embodiments, the box erecting device 102 includes one or more mounting feet 490 for mounting the box erecting device 102 to a surface. As illustrated, the folding plate 312 of the box erecting device 102 includes mounting feet 490*a-b*. The mounting foot 490*a* can be positioned on the second side 454 of the folding plate 312, and the mounting foot 490*b* can be positioned on the first side 452 of the folding plate 312. The mounting feet 490*a-b* can be otherwise suitably positioned for mounting the box erecting device 102 to a surface. For example, the mounting feet 490*a-b* can be positioned with respect to the folding plate 312 to mount the box erecting device 102 to the support frame 302 of the box erecting system 100. Additionally or alternatively, the mounting feet 490*a-b* can be used to mount the box erecting device 102 to the support surface 303 of the support frame 302, the mounting plate 320, and/or any other suitable structure.

Figure 7:
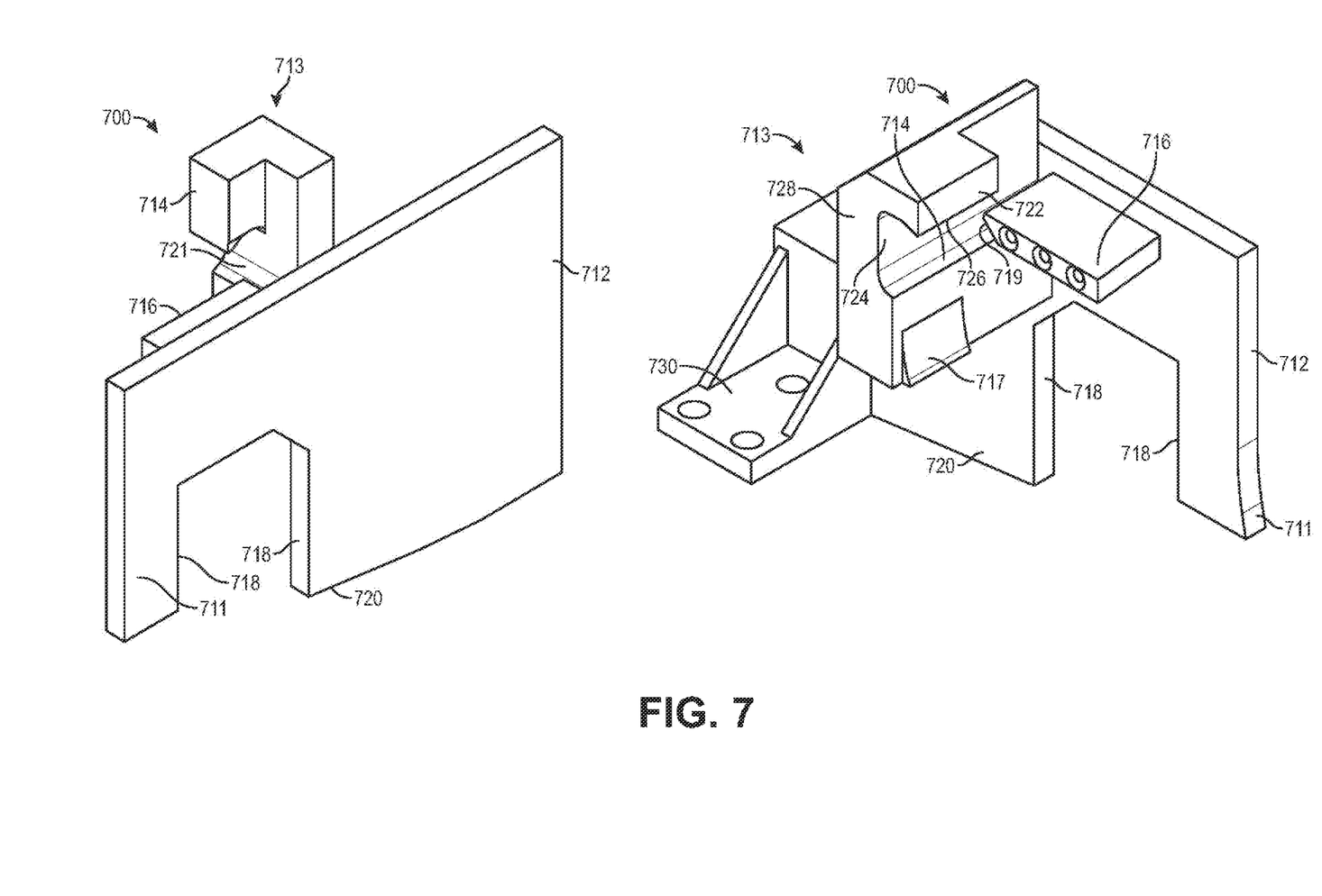
FIG. 7 is a set of views of another example of a box erecting device according to some examples of the present disclosure.
Figure 8:
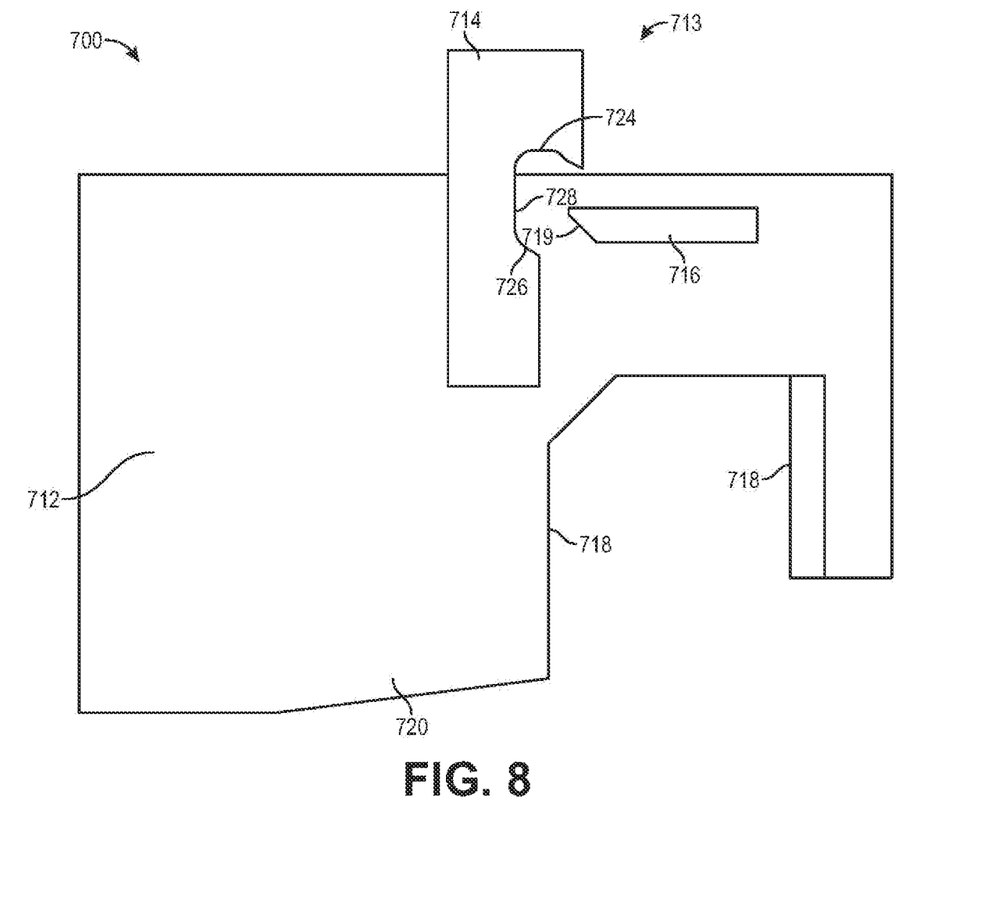
FIG. 8 is a side-view of the box erecting device of FIG. 7 according to some examples of the present disclosure.

FIG. 7 illustrates a set of views of another example of a box erecting device 700, and FIG. 8 illustrates a side-view of the box erecting device 700, according to some examples. The box erecting device 700 includes a folding plate 712, which may be formed as a rigid wall (e.g., similar to or otherwise included in the folding plate 312) and a lid erecting system 713. The folding plate 712 may be formed from a plate of flat bar or other such material. In a particular example, the folding plate 712 may have dimensions of between 125 cm and 200 cm (e.g., 150 cm) and between 50 cm and 100 cm (e.g., 75 cm), or any other suitable dimensions. The folding plate 712 and/or the box erecting device 700 itself may include means for connecting the box erecting device 700 to a table or other surface. As illustrated, the box erecting device 700 may also include a mounting structure 730 for connecting the box erecting device 700 to a surface.

As illustrated, a dust flap folding notch 718 (e.g., the notch 450) is formed in one end of the folding plate 712. The notch 718 may have a generally upside down U-shape. In some embodiments (e.g., illustrated with respect to FIG. 4), the notch 718 may include more than one notch or more than one side. The portion of the notch 718 located at distal portion of the folding plate 712 may define a leg that is shorter than the height of the folding plate 712. In some examples, the notch 718 may have dimensions of between 40 cm and 60 cm (e.g., 55 cm) on the longer edge proximally located, between 25 cm and 50 cm (e.g., 40 cm) on the shorter distally located edge, and between 25 cm and 50 cm (e.g., 35 cm) separated the proximal and distal edges, though other suitable dimensions are possible. As illustrated, the folding plate 712 includes a leg 711 that may include a sloped ramp at a distal end.

The interior surface of the U-shape on the leg 711 may have a relief slope extending from the right side and towards the left side and front views. The angle of this relief slope may be between 20 and 60 degrees (e.g., 45 degrees in some examples), though other suitable angles are possible. The bottom of the folding plate 712 may include a sloped relief section 720 extending between 2 and 10 degrees (e.g., 3 degrees in some examples), though other suitable angles are possible.

The lid erecting system 713 can include a folding tool 714, a tab funnel 717, and/or any other suitable components. The tab funnel 717 may be used to push against the dust flaps 206 of the box 110 (e.g., via the lid) as the box 110 is moved from the front side of the box erecting device 700 to the backside of the box erecting device 700. The folding tool 714 includes a structure, which is defined a hooked ramp 722. In some examples, the hooked ramp 722 may take the form of a C-shape. As illustrated, the hooked ramp 722 is defined by a first curved surface 724, a second curved surface 726, and a straight surface 728 connecting the first curved surface 724 and the second curved surface 726. The first curved surface 724 may terminate at an angle of between 20 and 85 degrees (e.g., 75 degrees in some examples), though other suitable angles are possible. As illustrated, the folding tool 714 may also include a ramp 721 configured to push against the closure panel of the lid 210 to ensure that the tuck flap 208 of the lid 210 is inserted sufficiently deep into the inner compartment of the box 110 so as to be held therein. In some examples, the dust flaps 206 and the join between the tuck flap 208 and the closure panel 212 may include corresponding grooves that engage with the each other when the tuck flap 208 is inserted into the box 110. These grooves may also function to resist removal of the tuck flap 208 from the box 110 (e.g., keep the lid 210 closed on the box 110).

As illustrated, the box erecting device 700 additionally includes an alignment block 716 that may be any suitable block having a rectangular or other suitable shape. The alignment block 716 may be configured to laterally align the box 110 with when flaps are pushed against the hooked ramp 722. As illustrated, the alignment block 716 may also be configured to push against the dust flaps 206 of the box 110 as the box 110 is initially pushed against the folding tool 714. The alignment block 716 may also include a sloped underside on one end 719 to enable a distal end of the lid 210 of the box 110 to pass thereby.

Figure 9:
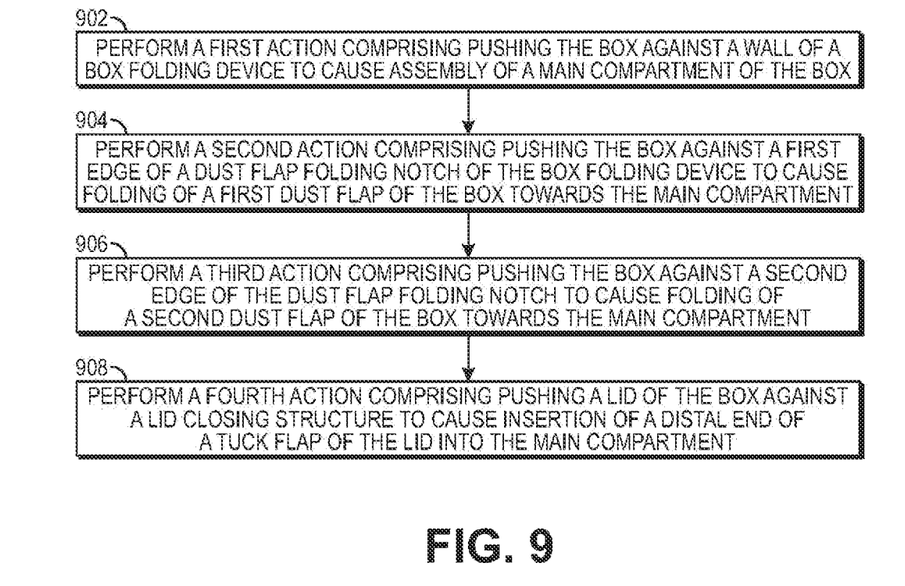
FIG. 9 is a flowchart of a process for folding a box using a box erecting device according to some examples of the present disclosure.

FIG. 9 illustrates a flowchart of a process 900 for folding a box using a box erecting device according to some examples. The box 110 may be manipulated via one or more of the operations described with respect to the process 900 using a robotic manipulator that can at least temporarily pick up and manipulate (e.g., via vacuum force) the box 110 using the end effector 108, vacuum nozzle 306, or a combination thereof. In some embodiments, the process 900 may be or otherwise include a computer-implemented process that includes a set of instructions for controlling the robotic manipulator 104 to manipulate the box 110 with respect to the box erecting device 102 to perform the recited operations of the process 900. In some embodiments, one or more operations of the process 900 may also be performed, at least in part, by a human operator. Additionally, while the process 900 is described with respect to the box erecting device 102, the box erecting device 700 can additionally or alternatively be used with respect to the process 900.

The process 900 may begin at block 902 by performing a first action that includes pushing the box 110 against a wall (e.g., the folding plate 312) of the box erecting device 102 to cause assembly of a main compartment 202 of the box 110. In some embodiments, the box 110 may begin in a collapsed state and in a beginning position (e.g., in the box retaining device 304). For example, the robotic manipulator 104 may pick up the box 110 from a stack of boxes retained in the box retaining device 304 and placed the box 110 in the beginning position. In some examples, as the box erecting device 102 may be mounted to a surface, the box 110 may be supported by a surface in the beginning position. In some examples, the first action can include raising the end effector 108 as the box 110 is pushed into the folding plate 312, which causes the main compartment 202 to open up. In some embodiments, the robotic manipulator 104 can manipulate the box 110 with respect to the folding plate 312 to erect the pair of dust flaps 206 by pushing the pair of dust flaps 206 against edges of a folding notch 450 of the folding plate 312.

At block 904, the process 900 includes performing a second action that includes pushing the box 110 against a first edge (e.g., the first notch 450a) of the notch 450 of the box erecting device 102 to cause a first dust flap 206 of the box 110 to be folded towards the main compartment 202. When the robotic manipulator 104 or other suitable entity performs the second action, the tuck flap 208 and closure panel 212 may extend below the folding plate 312 into the sloped relief section 120. In this manner, the box 110 may be driven into the first edge of the notch 450 to a depth sufficient to fold the first dust flap 206 into the box 110 without other sections of the box 110 interfering with the folding plate 312.

At block 906, the process 900 includes performing a third action that includes pushing the box 110 against a second edge (e.g., the second notch 450b) of the notch 450 to cause a second dust flap 206 of the box 110 to be folded towards the main compartment 202. In some examples, the third action includes a movement that may be opposite of the second action. Because the leg of the notch 450 is shorter than the folding plate 312, when the third action is performed, the tuck flap 208 and closure panel 212 can pass freely below the leg.

At block 908, the process 900 includes performing a fourth action that may include a sequence of actions that includes pushing the lid 210 of the box 110 against a lid erecting system 314 to cause a distal end of a tuck flap 208 of the lid 210 to be inserted into the main compartment 202 of the box 110. The fourth action may include positioning the box 110 on a second side of the folding plate 312 and positioning a distal end of the tuck flap 208 into at a bottom portion of the tab funnel 460. The box 110 may be driven towards the lid erecting system 314, which can cause the tuck flap 208 to begin to bend toward the main compartment 202 and upwards along the hooked ramp 466. Shortly after this action, the box 110 may be moved downwards while still moving towards the lid erecting system 314, which can cause the tuck flap 208 to curve through the hooked ramp 466 and be directed into a thin opening defined by the dust flaps 206 and the top side of the box 110. As part of this action, the box 110 may be directed towards the lid erecting system 314 such that the closure panel 212 engages with the lid erecting system 314, thereby pushing the entire lid 210 towards the main compartment 202 and inserting the entirety of the tuck flap 208 into the main compartment 202. In some embodiments, the robotic manipulator 104 can manipulate the box 110 with respect to a folding tool 462 of the lid erecting system 314 to cause a distal end of the tuck flap 208 of the box 110 to be folded into the main compartment 202 of the box 110 after the tab funnel 460 has been used to retain the pair of dust flaps 206 at least partially within the main compartment 202. In some examples, this process may be repeated on the second end of the box 110 after the box has been filled with product using other systems.

Figure 10:
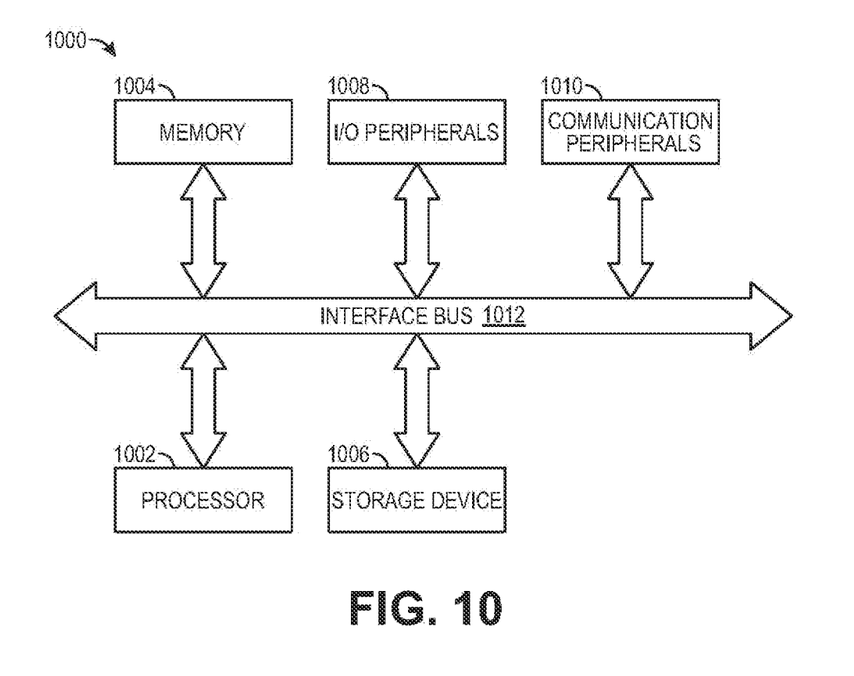
FIG. 10 is a block diagram of an example of a computer system that can be used to control a robotic manipulator to fold a box with a box erecting device according to some examples of the present disclosure.

FIG. 10 illustrates examples of components of a computer system 1000, according to at least one example. The computer system 1000 may be a single computer such as a user computing device and/or can represent a distributed computing system such as one or more server computing devices. In some embodiments, the computer system 1000 is an example of the computer system 106. In some examples, the computer system 1000 may be configured to control the operation of one or more automated elements, such as robotic manipulators, conveyor belts, robotic palletizers, and any other automated equipment, of a warehouse, manufacturing facility, bottling facility, packing facility, or the like.

The computer system 1000 may include at least a processor 1002, a memory 1004, a storage device 1006, input/output peripherals (I/O) 1008, communication peripherals 1010, and an interface bus 1012. The interface bus 1012 is configured to communicate, transmit, and transfer data, controls, and commands among the various components of the computer system 1000. The memory 1004 and the storage device 1006 include computer-readable storage media, such as Radom Access Memory (RAM), Read ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. The memory 1004 and the storage device 1006 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer system 1000.

Further, the memory 1004 includes an operating system, programs, applications, and/or other software, models, modules, and the like. The processor 1002 is configured to execute the stored instructions and includes, for example, a logical processing unit, a microprocessor, a digital signal processor, and other processors. The memory 1004 and/or the processor 1002 can be virtualized and can be hosted within another computing system of, for example, a cloud network or a data center. The I/O peripherals 1008 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1008 are connected to the processor 1002 through any of the ports coupled to the interface bus 1012. The communication peripherals 1010 are configured to facilitate communication between the computer system 1000 and other computing devices over a communications network and include, for example, a network interface controller, modem, wireless and wired interface cards, antenna, and other communication peripherals.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and all three of A and B and C.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A box erecting system, comprising:
   a support frame;
   a box erecting device fixedly mounted to the support frame and configured for erecting a box, the box erecting device comprising:
   a folding plate that includes a notch abutting a lid erecting system, the notch to erecting a pair of dust flaps of the box, wherein the notch comprises a pair of substantially parallel opposing sides; and
   the lid erecting system fixedly mounted to the folding plate and configured for erecting a lid of the box; and
   a robotic manipulator fixedly mounted to the support frame and comprising an end effector, the robotic manipulator configured for manipulating the box with respect to the box erecting device using the end effector to erect the box.

2. The box erecting system of claim 1, further comprising:
   a mounting plate that is detachably mounted to the support frame adjacent the robotic manipulator; and
   one or more clamps configured to detachably mount the mounting plate to the support frame, wherein the box erecting device is fixedly mounted to the mounting plate.

3. The box erecting system of claim 1, further comprising an assembled box chute that includes a ramp and disposed adjacent the robotic manipulator, wherein the robotic manipulator is configured to drop the box into the assembled box chute after the box has been assembled.

4. The box erecting system of claim 1, further comprising:
   a box retaining structure fixedly mounted to the support frame adjacent the box erecting device, and configured for retaining one or more unassembled boxes; and a box feeder system comprising an unassembled box chute that is connected to the box retaining structure, wherein the robotic manipulator is configured to pick up the box in an unassembled state from the box retaining structure before using the box erecting device to erect the box.

5. The box erecting system of claim 1, wherein the robotic manipulator is configured to:

manipulate the box with respect to the folding plate to erect a main compartment of the box by pushing the box against a surface of the folding plate and to erect the pair of dust flaps by pushing the pair of dust flaps against edges of a folding notch of the folding plate;

manipulate the box with respect to a tab funnel of the lid erecting system to retain the pair of dust flaps at least partially within the main compartment; and manipulate the box with respect to a folding tool of the lid erecting system to cause insertion of a distal end of a tuck flap of the box into the main compartment of the box after the tab funnel has been used to retain the pair of dust flaps at least partially within the main compartment.

\* \* \* \* \*